(12) United States Patent
Takeda

(10) Patent No.: US 7,387,825 B2
(45) Date of Patent: Jun. 17, 2008

(54) PREFORM FOR SMALL FLAT CONTAINER AND SMALL FLAT CONTAINER

(75) Inventor: Hiroshi Takeda, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 465 days.

(21) Appl. No.: 10/481,740

(22) PCT Filed: Jun. 18, 2002

(86) PCT No.: PCT/JP02/06069
§ 371 (c)(1),
(2), (4) Date: Feb. 20, 2004

(87) PCT Pub. No.: WO03/002327
PCT Pub. Date: Jan. 9, 2003

(65) Prior Publication Data
US 2004/0262321 A1 Dec. 30, 2004

(30) Foreign Application Priority Data
Jun. 29, 2001 (JP) ............................. 2001-199511

(51) Int. Cl.
B65D 1/02 (2006.01)
B29C 49/06 (2006.01)

(52) U.S. Cl. ............... 428/35.7; 428/542.8; 215/40; 215/42

(58) Field of Classification Search .......... 215/40, 215/42–44, 46; 428/35.7, 542, 542.8
See application file for complete search history.

(56) References Cited

U.S. PATENT DOCUMENTS 2,227,091 A * 12/1940 Kendrick .................. 222/581
2,579,899 A * 12/1951 Burrows ................... 222/196.2
2,789,312 A * 4/1957 Borer ....................... 425/526
2,792,593 A * 5/1957 Hardgrove, Jr. ........... 425/525
3,137,748 A * 6/1964 Makowski ................. 264/537
3,160,304 A * 12/1964 Peacock .................... 224/666

(Continued)

FOREIGN PATENT DOCUMENTS

DE 19917916 10/2000

(Continued)

Primary Examiner—Sue A Weaver
(74) Attorney, Agent, or Firm—Weingarten, Schurgin, Gagnebin & Lebovici LLP

(57) ABSTRACT

To solve the limit of wall-thickness adjustment of a preform for a small flat container by a flat core by forming the outer side of a step-up-formed large-wall-thickness shell part with reducing wall thickness. A preform 1 for a small flat container whose inside diameter is completely circular and restricted to a small value is used. A shell part 12 is step-out-formed from the boundary between a neck part 11 and a shell part 12 so that the shell part 12 has a diameter larger than the neck part 11. A difference is provided between wall thickness of forward/backward sides 12a and right/left sides 12b of the shell part 12 by forming the outer side of the shell part into an ellipse form or the like from the underside of step-out at with reducing wall thickness. A stepped out part 14 is left like a disk in the underside of the neck part.

3 Claims, 4 Drawing Sheets

U.S. PATENT DOCUMENTS

| | | | |
|---|---|---|---|
| 4,254,080 A * | 3/1981 | Agrawal | 264/537 |
| 4,380,526 A * | 4/1983 | Agrawal | 264/537 |
| 4,724,116 A | 2/1988 | Aoki | |
| 5,101,990 A * | 4/1992 | Krishnakumar et al. | 215/383 |
| 5,158,817 A * | 10/1992 | Krishnakumar | 428/36.92 |
| 5,409,749 A * | 4/1995 | Uehara et al. | 428/35.7 |
| 5,417,991 A * | 5/1995 | Green | 426/241 |
| 5,662,245 A * | 9/1997 | Grant | 222/153.07 |
| 5,848,516 A * | 12/1998 | Ban | 53/453 |
| 6,230,913 B1 * | 5/2001 | Cornell et al. | 215/387 |
| 6,279,794 B1 * | 8/2001 | Miyazaki | 224/148.7 |
| 7,033,535 B1 * | 4/2006 | Limanjaya | 264/533 |

FOREIGN PATENT DOCUMENTS

| | | |
|---|---|---|
| JP | 05057782 | 3/1993 |
| JP | 2000-127230 A | 5/2000 |

* cited by examiner

PREFORM FOR SMALL FLAT CONTAINER AND SMALL FLAT CONTAINER

FIELD OF THE INVENTION

This application is a 371 national phase filing of PCT/JP02/06069 filed Jun. 18, 2002, and claims priority to a Japanese application No. 2001-199511 filed Jun. 29, 2001.

BACKGROUND ART

When manufacturing a flat container having a thin-walled shell part by blow-molding with stretch or without stretch by using an injection-molded preform, the wall thickness between forward and backward surface sides and right and left surface sides of the shell part of the preform is adjusted to provide a difference in the heat capacity of the shell part. The wall thickness is adjusted by forming the outer side of the shell part into an oval or parallel plane or by using a flat core for an injection core and thereby forming the inner opposed planes of the shell part into parallel planes. However, the wall thickness of the shell part is mostly adjusted by a flat core because the wall thickness can be easily set.

However, in the case of a narrow-mouthed small flat container for eyewash or cosmetics, the inside diameter of a preform is also restricted. Accordingly, the injection core used for the preform is limited to small inner diameter, thus, it becomes very difficult to form both sides of such injection core flat because the injection core has double cooling passages. For this reason, a small flat container which can be manufactured by adjusting the wall thickness of the shell part of a preform by a flat core is limited.

The present invention is made in response to the above situation and its object is to provide a novel preform capable of manufacturing a narrow-mouthed small flat container which is thin in wall thickness and is well adjusted in thickness distribution and to provide a small flat container manufactured by using the preform. The object is attained by solving the limitations on wall thickness adjustment due to a flat core by providing a wall thickness difference (heat capacity difference) indispensable for flat-molding and by preventing the shell part to be blow molded from biasing the wall thickness in flatting.

DISCLOSURE OF THE INVENTION

A preform for a small flat container of which the inner cross section is complete round and limited to a small inner diameter, wherein a shell part is formed by stepping out from a boundary between the shell part and the neck part so as to have a diameter larger than that of a neck part, the outer side of the shell part is formed into an oval shape-like form from the underside of the stepped out part by reducing the wall thickness, a difference in wall thickness between the forward/backward surface sides and the right/left surface sides of the shell part is provided, and at the same time the stepped out part is formed into a disc shape below the neck part as it remains.

Moreover, the small flat container of the present invention is a narrow-mouthed small flat container manufactured by blow-molding the preform for the small flat container, in which the narrow-mouthed small flat container manufactured is constituted by having a disk-shaped stepped out part below the neck part and by flatly forming the shell part in a thin wall continuously following to the lower margin of the stepped out part.

BEST MODE FOR CARRYING OUT THE INVENTION

Figure 1:
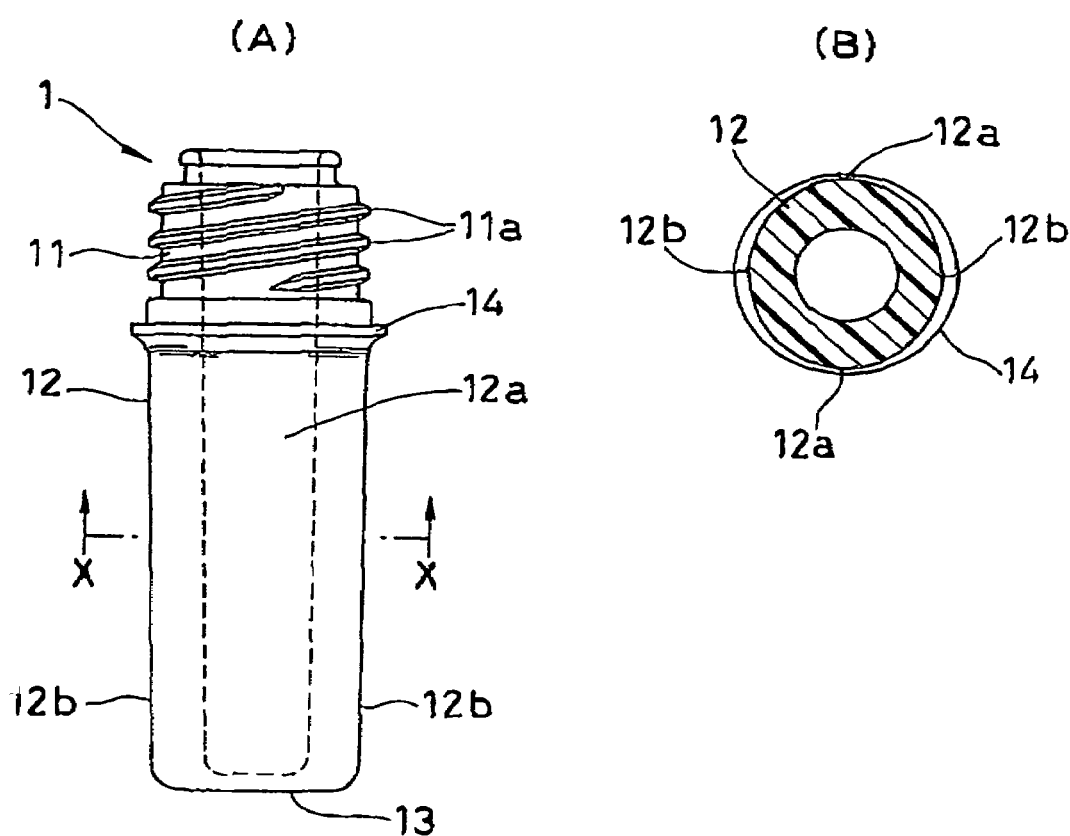
FIG. 1(A) is a front view of a preform for a small flat container of the present invention and FIG. 1(B) is a sectional view of the preform taken along the line X-X.

FIG. 1 shows an embodiment of a preform 1 for a small flat container of the present invention. The preform 1 is a bottomed preform obtained by integrally forming a neck part 11 and a shell part 12 with a polyester resin such as polyethylene terephthalate (PET), polypropylene (PP), polycarbonate (PC), or polyethylene (PE) through injection molding.

The preform 1 has a total height of 30 mm, and its outer diameter including a thread 11a of the neck part 11, having a height of about one-third of the total height, is 8.8 mm, and its inner diameter is in a complete round though. The inner diameter is slightly reduced toward the bottom part 13 from the opening of the neck part 11 because of setting the draft for an injection core, and its diameter is restricted as small as to 4.5 mm at the opening.

Moreover, the shell part 12 is formed by stepping out in thick-walled to a diameter (14.2 mm) larger than that of the neck part 11 from its boundary with the neck part 11, the outer side of the shell part 12 is formed in an oval shape by reducing wall thickness from the underside of the stepped out part to form the forward/backward sides 12a of the shell part 12 in thick-walled (2.6 mm) and to form the right/left sides 12b by gradually reducing the wall thickness (2.0 mm) related to the inside of the complete round. Moreover, by forming the outer side of the shell part with the wall thickness reducing, a stepped out part 14 is provided in a disk shape at the underside of the neck part 11.

In this preform 1, it is possible to freely set the wall thickness of the shell part 12 in accordance with the step-out. By assuming the set wall thickness as the maximum wall thickness and by forming the outer side of the shell part in an oval shape or parallel plane though the plane is not illustrated, it is possible to provide a difference between wall thickness of the forward/backward sides 12a and the right/left sides 12b. Therefore, adjustment of the wall thickness of the shell part 12 is not restricted in the projection plane of the neck part 11, and it becomes possible to set the wall thickness in the range exceeding the outer side diameter of the neck part 11. Thus, it is possible to form easily even a narrow-mouthed small flat container of which inner diameter is restricted to a small diameter.

Figure 2:
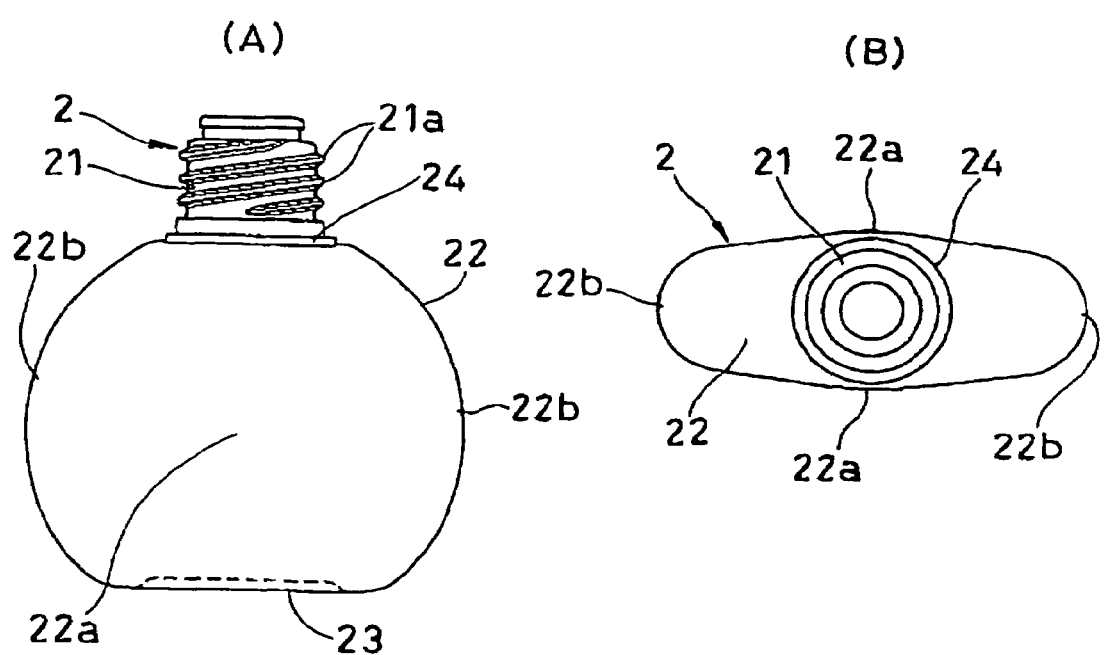
FIG. 2(A) is a front view of a small flat container of the present invention and FIG. 2(B) is a top view of the container.

FIG. 2 shows a narrow-mouthed small flat container for eyewash manufactured from the preform 1. The small flat container 2 is constituted by a neck part 21 having a thread 21a at the periphery, a disk-shaped stepped out part 24 integrally formed at an underside of the neck part 21, and a thin-walled shell part 22 formed flat by stretch-blow molding to forward/backward sides 22a and a bottom part 23 on a flat surface and right/left sides 22b like a circular arc form from the lower margin of the neck part 21.

Figure 3:
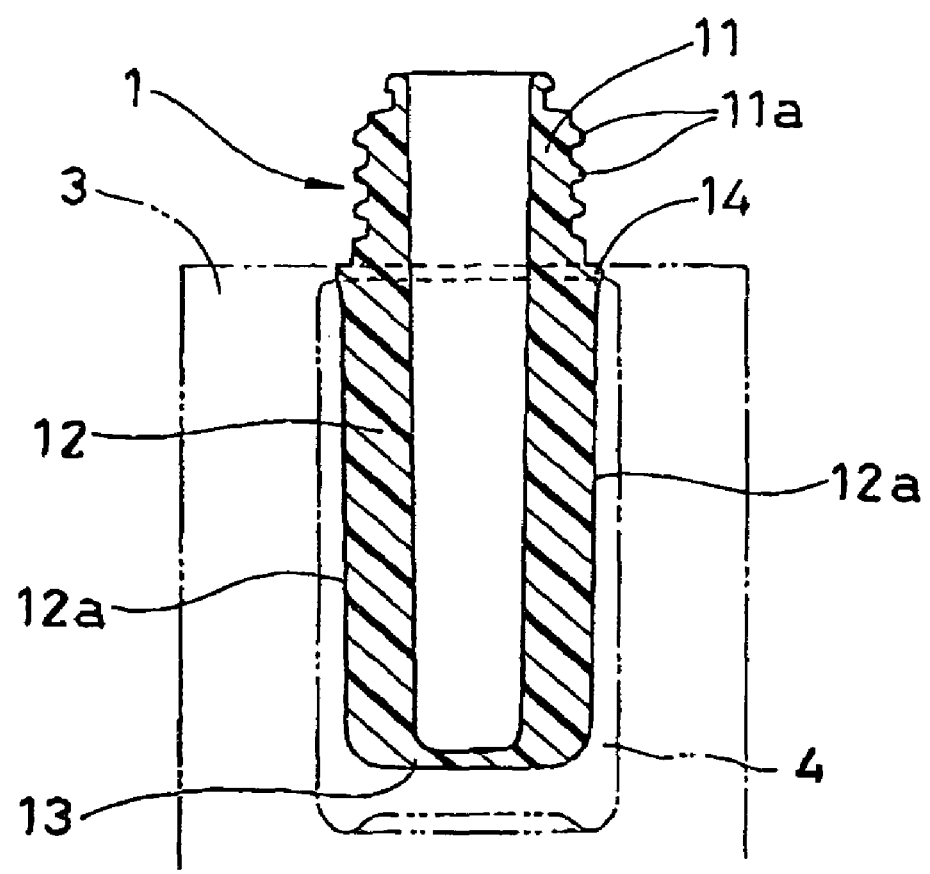
FIG. 3 is a longitudinal sectional side view of a preform for which a blow mold is shown by a chain line.
Figure 4:
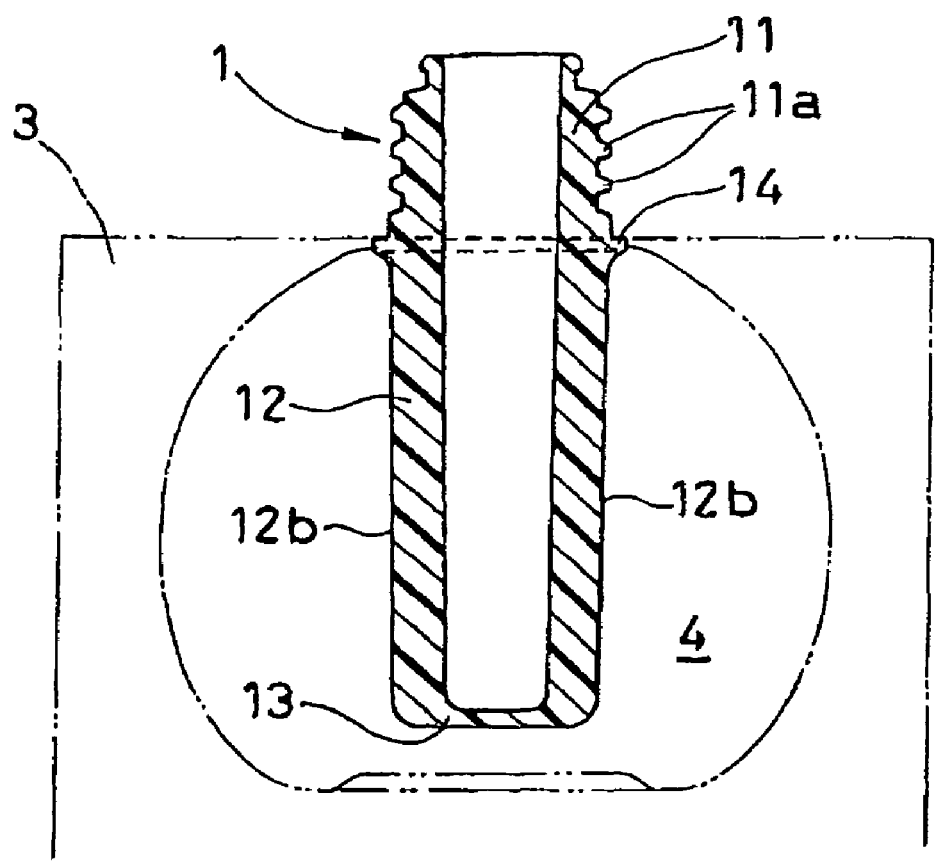
FIG. 4 is a longitudinal sectional front view of a preform for which a blow mold is shown by a chain line.

It is possible to easily form the small flat container 2 by setting the preform 1 whose shell part 12 is in high temperature including the stepped out part 14 through mold release after injection molding in the flat cavity 4 of a blow mold 3, by holding the neck part 11 as remains and stretch-blowing to the shell part 12 with filling the whole flat cavity by using an extension rod and air blowing in the same as in the case of stretch-blow molding of a common container, though this operation is not illustrated. In this case, as shown in FIG. 3, it is preferable to set the preform 1 that the forward/backward sides 12*a* and 12*a* of the shell part 12 formed being thick-walled are located to face onto the small-width mold surfaces of the flat cavity 4, making the thin-walled right/left sides 12*b* and 12*b* face the large-width mold surfaces as shown in FIG. 4. This is because even if the forward/backward sides 12*a* and 12*a* are previously cooled earlier in contact with the mold surface due to a difference in blow expansion magnifications, thick-walled forward/backward sides 12*a* and 12*a* respectively have a larger heat capacity, and a sufficient heat quantity these from is secured to make the preform hot even after they contact with the mold surface, they can expand in right and left directions. Thereby, the thin-walled right/left sides 12*b* and 12*b* are also smoothly expanded and the whole shell part is formed into a flat shell part having a uniform wall thickness.

Moreover, because a sufficient heat quantity is secured with the disk shaped stepped out part 14 formed at its boundary with the neck part 11 saving for the shell part 12, the part 12 is uniformly expanded to the circumference followed by the lower margin of the stepped out part 14. In the case of a molding of a conventional small flat container, because the shell part 12 thereof is stretched and expanded directly from the boundary with the neck part 11 without stepped out, the boundary is formed into a curved shape and easily becomes a long-hem state, trailing. Thereby, it is difficult to clearly form the boundary between the neck part 21 and shell part 22. However, as shown in FIGS. 2(A) and 2(B), in the small flat container 2 of the present invention there is obtained a small flat drum-like container 2 whose shape is well-ordered because the neck part 21 rises from the stepped out part 24 in a circular surface and whose shoulder part is preferably finished.

INDUSTRIAL APPLICABILITY

The present invention is made in response to the above situation. The object of the present invention is to provide a novel preform capable of manufacturing a narrow-mouthed small flat container which is thin-walled and is well adjusted in thickness distribution and to provide a small flat container manufactured by using the preform. The object is attained by dissolving the limitations on wall thickness adjustment due to a flat core by providing a wall thickness difference (heat capacity difference) indispensable for flat-molding and by preventing the wall thickness of the shell part from being biased in flatting by blow molding.

The invention claimed is:

1. A preform having a circular inner cross section that is limited to a small inner diameter for a small, flat container, the perform comprising:
   a circular neck part;
   a shell part having a front side, a rear side, a left side, and a right side; and
   an annular, disk-shaped, stepped out part of unitary construction and having a cylindrical upper portion adjacent the neck part and a lip portion of increased width between the upper portion and the shell part further tapering to the shell part,
   wherein the front side and the rear side include relatively thick-walls and the left side and the right side include relatively thin-walls.

2. A preform according to claim 1, wherein the preform has a tapered inner diameter that is less near a bottom end than near a neck end.

3. A preform according to claim 1, wherein the annular stepped out part is not formed inside the neck part.

* * * * *

UNITED STATES PATENT AND TRADEMARK OFFICE
CERTIFICATE OF CORRECTION

PATENT NO. : 7,387,825 B2  Page 1 of 1
APPLICATION NO. : 10/481740
DATED : June 17, 2008
INVENTOR(S) : Hiroshi Takeda It is certified that error appears in the above-identified patent and that said Letters Patent is hereby corrected as shown below:

Column 1, after line 2, following the title of the invention, please insert the following paragraph:

--This application is a 371 national phase filing of PCT/JP02/06069 filed June 18, 2002, and claims priority to a Japanese application No. 2001-199511 filed June 29, 2001.--; and Column 1, lines 6-8, after FIELD OF THE INVENTION, please delete the paragraph beginning with "This application is a" and its entirety and replace it with the following paragraph:

--The present invention relates to a perform injection-molded for the manufacture of a small flat container for eyewash or cosmetics and a narrow-mouthed small flat container manufactured from the perform.--

Signed and Sealed this

Fifteenth Day of September, 2009

David J. Kappos
*Director of the United States Patent and Trademark Office*